Oct. 17, 1939. R. L. BURKE 2,176,664
APPARATUS FOR FABRICATING STRUCTURAL ELEMENTS
Original Filed April 23, 1937 2 Sheets-Sheet 2
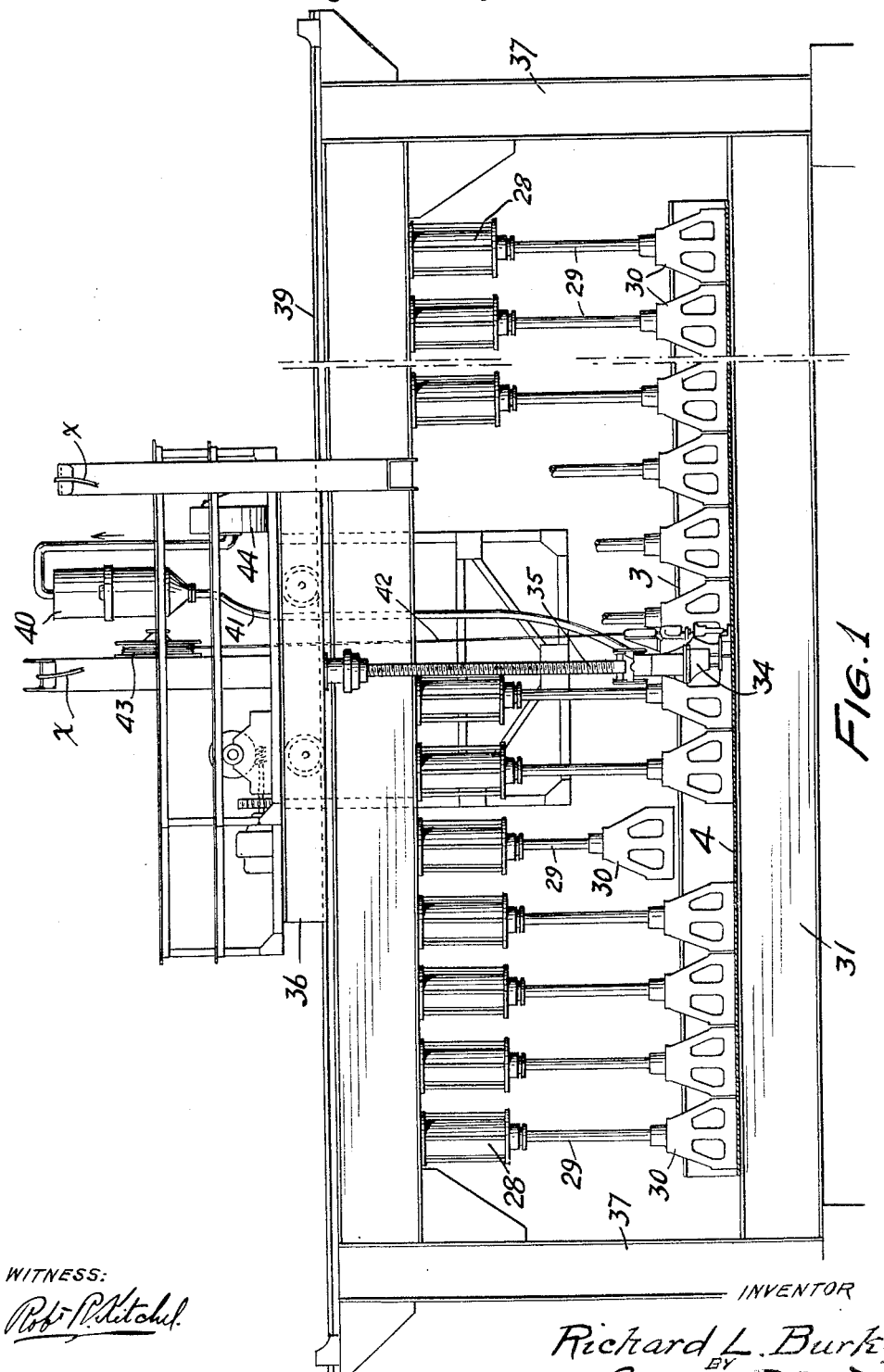

Patented Oct. 17, 1939

2,176,664

UNITED STATES PATENT OFFICE 2,176,664

APPARATUS FOR FABRICATING STRUCTURAL ELEMENTS

Richard L. Burke, Swarthmore, Pa., assignor to Sun Shipbuilding & Dry Dock Company, Chester, Pa., a corporation of Pennsylvania Original application April 23, 1937, Serial No. 138,498, now Patent No. 2,142,109, dated January 3, 1939. Divided and this application May 3, 1938, Serial No. 205,720

4 Claims. (Cl. 113—59)

This invention relates to apparatus for the fabrication of structural elements from metal plates and shapes by welding. From a more specific standpoint, this invention relates to apparatus for fabricating bulkheads, bottom and side shell and deck plating panels, etc., for ships from metal plates and shapes adapted to act as stiffeners, longitudinals, etc.

Heretofore it has been the practice to fabricate various structures, such as bulkheads, bottom shell, side shell and decks from plates and shapes, as stiffeners, longitudinals, etc. by riveting or welding the plates and shapes together. Such procedure is difficult of accomplishment, more particularly in the proper lining up of the plates and shapes, and especially where the plates and shapes are secured by welding, inasmuch as it is difficult, if not impossible, to prevent distortion resulting from the heat of welding. Such procedure has been found further disadvantageous from the standpoint of time and labor.

Now, in accordance with this invention, an apparatus has been developed with which the plates and shapes comprising a given structural element, such as a ship's bulkhead, may be easily and accurately fabricated, with a minimum of time and labor, to a point such that they require only to be placed in position and secured.

The apparatus in accordance with this invention is especially adaptable to the fabrication of ship bulkheads and bottom shell, side shell and deck plate panels, etc., for ships formed from a series of plates and stiffeners, longitudinals, etc. In following the procedure and with use of the apparatus the necessary shapes are secured to the plates by welding, and the component plates are welded together to form a complete element ready for placing in position and securing.

The apparatus in accordance with this invention is especially advantageous in the forming of structural elements for ships, in that the shapes are, without difficulty, secured to the plates with a full metal to metal contact and with avoidance of warping of the plates usually resulting from welding. Further, the plates are secured together with avoidance of warping due to the welding heat to the end that, on completion, the shapes and plates forming the element are integrally related and the element as a whole is true and without distortion.

The details of the apparatus in accordance with this invention and its operation will be clarified by the following description, all with reference to the accompanying drawings, in which a preferred embodiment of the apparatus in form for the fabrication of, for example, bulkheads for ships has been illustrated, and in which:

Figure 1 is a transverse view, partly in section, showing mechanism for holding and welding plates in the formation of a bulkhead.

Figure 2:
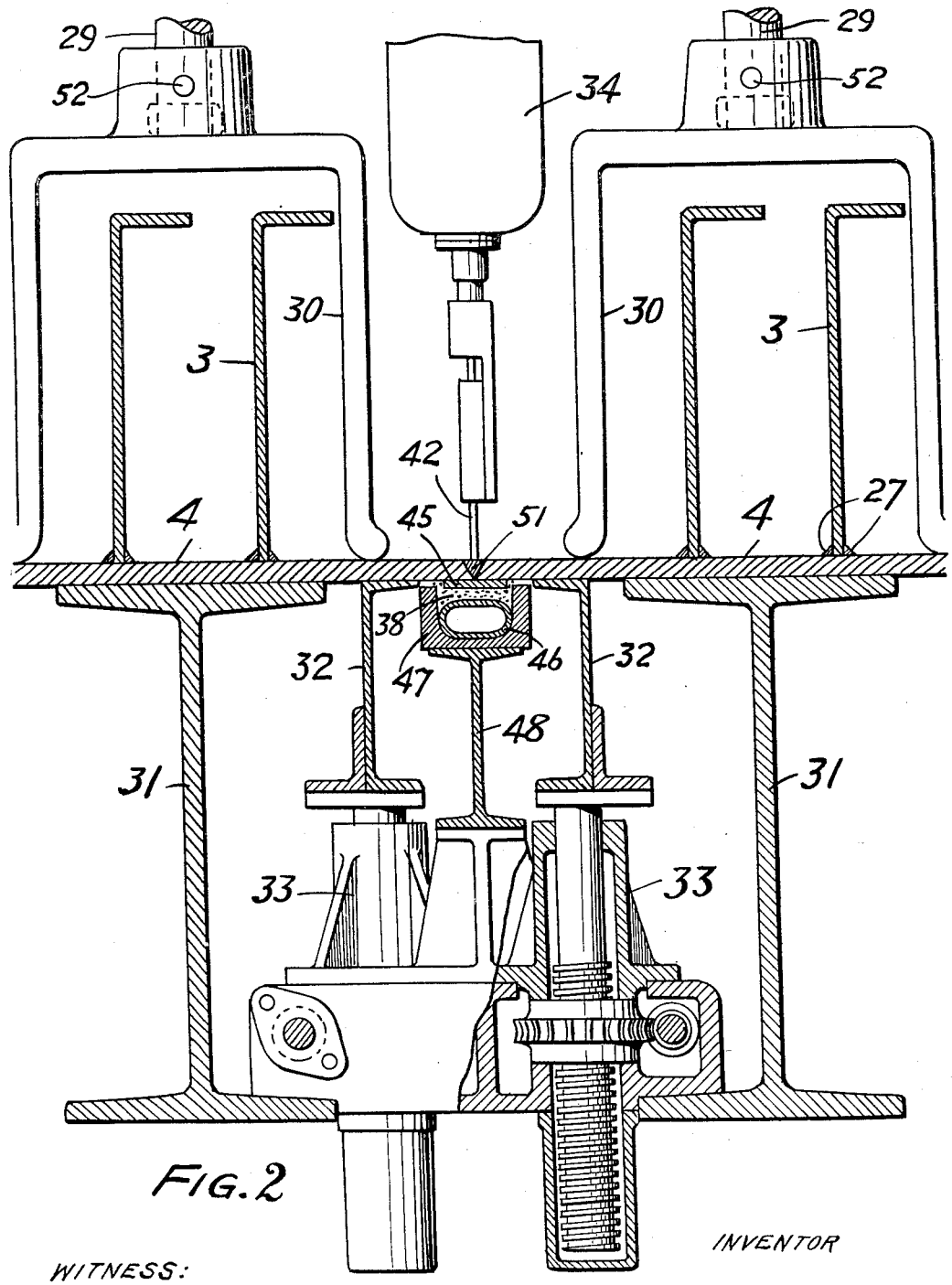
Figure 2 is a view showing details of construction of the subject of Figure 1.

The embodiment of the apparatus in accordance with this invention, as illustrated, which, as has been indicated, functions in connection with the butt-welding together of plates to which stiffeners have been secured for the formation of a completed bulkhead, comprises a series of rams extending transversely of the apparatus in two parallel rows and a welder carried on a trolley and mounted for movement transversely of the apparatus between the parallel rows of rams.

The rams, respectively, comprise pneumatic and hydraulic cylinders 28, within which are pistons and to which are connected rods 29, carrying on their lower ends yokes or bifurcated heads 30. The heads 30 are secured to the rods 29 by means of pins 52. Beneath the heads 30 are positioned heavy I-beams 31, 31 in line with the bed of castors 2, and for the support of the plates to be welded together.

Between the I-beams 31, 31 are a pair of supports 32, 32 mounted on screw jacks 33, 33 and arranged to engage the edge portions of a pair of plates to be welded and to provide means whereby plates of different thickness may be brought to a level.

The welder 34 is carried on a screw 35 depending from a trolley 36 carried by a bridge 37 running on rails 39 extending transversely of the apparatus. In its movement the trolley 36 carries the welder transversely for the welding of the abutting edges of a pair of plates. The welder 34 is of any usual electric type and may be the same as the welder 15 of element B. The welder will desirably be made reversible so that it may be operated in either direction for accomplishing the butt-welding.

The welder is supplied with melt or flux from a tank 40, through a tube 41 and with wire 42 from a reel 43. The flux tank and reel are carried with the welder on the trolley 36 and the suction side of a fan 44 communicates with a tube leading to a head following the welder for return of excess flux to the tank 40.

A copper bar 45 is positioned beneath the abutting edges of the plates and is adapted to be pressed up against the under side of the plates 4, 4 along the line of their abutting edges, to act as a dam, by means of a pneumatically inflated hose 46 carried in a channel member 47 filled with sand or melt 38, which covers the hose and protects it from the heat of the weld. The channel is supported by an I-beam 48.

In operation of the apparatus, the edges of the pair of plates 4, 4, having stiffeners 3 welded to the upper surfaces thereof, are brought together in alignment over the bar 45, with their edge portions supported on the I-beam 31 and the supports 32. The supports 32 are adjusted by means of the jacks 33 to provide an accurately leveled support for the edge portions of the plates, and the feet of the bifurcated heads 30 of the parallel series of rams are brought down on the upper surface of the plates, under pneumatic pressure supplied to the cylinders 28, to clamp the edge portions of the plates to the supports 32 and I-beams 31.

Since the heads are bifurcated, they will straddle the stiffeners carried by the plates and permit holding of the edge portions of the plates securely to the supports 32, irrespective of the location of the stiffeners. Since the supports 32 are leveled, the heads 30, acting individually, will straighten out any irregularity in the edge portions of the plates, so that their abutting edges will be exactly level.

The welder is then put into operation and moved from side to side of the plates to effect welding of their abutting edges.

During the welding operation, the bar 45 is pressed against the bottom of the joint by the inflation of the hose 46, the hose being protected from heat by the sand or melt which covers it.

During the welding operation the edge portion of the plates is held in position and prevented from warping by the heads 30.

The welding having been completed, the heads 30 are elevated and the welded plates may be moved off on the bed of rollers 2, which may extend to any desired extent.

The operations described above may produce a finished structural element, as a bulkhead. On the other hand, if, for example, as in the case of a bulkhead, it be desired to add further stiffeners, as, for example, stiffeners transverse to those already applied, such may best be accomplished by hand welding.

In use of the appaartus of this invention, it will be found that structural elements, as, for example, bulkheads, bottom, side and deck plate panels, etc. for ships, may be assembled and welded into an integral structure with the greatest accuracy and at a great saving in time and labor over procedure heretofore known.

It will be understood that the apparatus in accordance with this invention is contemplated as adaptable for use in the fabrication of structural elements other than those more particularly mentioned herein and that as a consequence any use for which the apparatus is adaptable is contemplated as within the scope of this invention.

It will be undertood that various modification in detail may be made in the apparatus according to this invention as herein described without departing from the scope of this invention.

This application is a division of an application filed by me Serial No. 138,498, filed April 23, 1937, now United States Patent No. 2,142,109, dated January 3, 1939.

What I claim and desire to protect by Letters Patent is:

1. In apparatus for the fabrication of structural elements from a pair of plates by welding, each of said plates having a shape secured thereto, in combination, means for the support of a pair of plates in abutting relation, clamping heads respectively positioned to engage a plate, each of the clamping heads adapted to engage a plate at a point adjacent the abutting edges of the plates and at a point relatively remote from the abutting edges of the plates, said clamping heads adapted to straddle a shape between their points of engagement with the plates and means for applying force to said clamping heads whereby the abutting edges of said plates are adapted to be aligned for welding and held in alignment during welding.

2. In apparatus for the fabrication of structural elements from a pair of plates by welding, each of said plates having a shape secured thereto, in combination, means for the support of a pair of plates in abutting relation, a plurality of bifurcated clamping heads respectively positioned to engage the plates respectively at points spaced longitudinally of and adjacent their abutting edges and at points spaced longitudinally of and relatively remote from their abutting edges and spaced from the points of engagement adjacent the edges of the plate, said clamping heads respectively adapted to straddle a shape and means for applying force to said clamping heads whereby the abutting edges of said plates are adapted to be aligned for welding and held in alignment during welding.

3. In apparatus for the fabrication of structural elements from a pair of plates by welding, each of said plates having a shape secured thereto, in combination, means for the support of a pair of plates in abutting relation, a plurality of independent clamping heads adapted to be positioned in alignment with the abutting edges of said plates on opposite sides of the line of abutment thereof, the clamping heads on opposite sides of the line of abutment of the plates being adapted to engage the plates respectively at a plurality of points spaced longitudinally of and adjacent to the line of abutment of the plates, and at a plurality of points spaced longitudinally of and relatively remote from the line of abutment of the plates and spaced from the points of engagement adjacent the line of abutment, said clamping heads respectively adapted to straddle a shape and means for applying force to said clamping heads respectively whereby the abutting edge portions of said plates are adapted to be aligned for welding and held in alignment during welding.

4. In apparatus for the fabrication of structural elements from a pair of plates by welding, each of said plates having a shape secured thereto, in combination, a pair of aligned supports for the support of the edge portions of a pair of plates positioned in abutting relation, a plurality of bifurcated clamping heads adapted to be positioned in alignment with the abutting edges of said plates on opposite sides of the line of abutment thereof and adapted to engage the edge portions of said plates respectively at points adjacent the line of abutment of the plates and at points relatively remote from the line of abutment of the plates, said clamping heads respectively adapted to straddle a shape, means for applying force to said clamping heads respectively whereby the edge portions of said plates are adapted to be clamped to said support and aligned for and held in alignment during welding.

RICHARD L. BURKE.